US006988057B2

(12) United States Patent
Huang et al.

(10) Patent No.: US 6,988,057 B2
(45) Date of Patent: Jan. 17, 2006

(54) METHODS FOR DESIGNING A CHAMBER TO REDUCE NOISE IN A DUCT

(75) Inventors: Lixi Huang, Hong Kong SAR (CN); Yat-Sze Choy, Hong Kong SAR (CN)

(73) Assignee: The Hong Kong Polytechnic University, Hong Kong (HK)

( * ) Notice: Subject to any disclaimer, the term of this patent is extended or adjusted under 35 U.S.C. 154(b) by 173 days.

(21) Appl. No.: 10/697,493

(22) Filed: Oct. 31, 2003

(65) Prior Publication Data

US 2005/0096882 A1 May 5, 2005

(51) Int. Cl.
*G06F 15/00* (2006.01)

(52) U.S. Cl. .................... 702/191; 702/69; 702/111; 702/190; 181/249; 181/255; 181/269

(58) Field of Classification Search .............. 702/111, 702/190–191, 69; 181/249, 255, 269
See application file for complete search history.

(56) References Cited

PUBLICATIONS

Kim YH, Solution of Coupled Acoustics Problems: A Partially Opened Caity Coupled with a Membrane and a Semi–Infinite Exterior Field, Journal of Sound and Vibration (Jul. 2002), vol. 254, pp. 231–244.*
Huang LX, Modal Analysis of Drimlike Silencer, Journal of the Acousitcal Society of America (Nov. 2002), vol. 112, No. 5, pp. 2014–2025.*
Boudy, M. Prediction of Acoustic Fields Radiated Into a Damped Cavity by an N–Port Source Through Ducts, Journal of Sound and Vibration , (Jul. 10, 2003), vol. 264, No. 3, pp. 499–521.*

J. Kang et al., "Predicting the Absorption of Open weave Textiles and Micro–Perforated Membranes Backed by an Air Space", Journal of Sound and Vibration, 1999, pp. 905–920, vol. 220, No. 5, Academic Press.
W. Frommhold et al., "Acoustic Performance of Membrane Absorbers", Journal of Sound and Vibration, 1994, pp. 621–636, vol. 170, No. 5, Academic Press Limited.
K.V. Horoshenkov et al., "A Method to Calculate the Acoustic Response of a Thin, Baffled, Simply Supported Poroelastic Plate", J. Acoust. Soc. Am., 2001, pp. 904–917, vol. 110, No. 2, Acoustical Society of America.
F. P. Mechel, "Panel Absorber", Journal of Sound and Vibration, 2001, pp. 43–70, vol. 248, No. 1, Academic Press.
Richard H. Lyon, "Noise Reduction of Rectangular Enclosures with One Flexible Wall", Journal of the Acoustical Society of America, 1963, pp. 1791–1797, vol. 35, No. 11, Acoustical Society of America.
A. J. Pretlove, "Free Vibrations of a Rectangular Panel Backed by a Closed Rectangular Cavity", Journal of Sound Vibrations, 1965, pp. 197–209, vol. 2, No. 3.
R. W. Guy, "The Response of a Cavity Backed Panel to External Airborne Excitation: A General Analysis", J. Acoust. Soc. Am., 1979, pp. 719–731, vol. 65, No. 3, Acoustical Society of America.
E.H. Dowell et al., "The Effect of a Cavity on Panel Vibration", AIAA Journal, 1963, pp. 476–477, vol. 1, No. 2.

(Continued)

*Primary Examiner*—John Barlow
*Assistant Examiner*—Sujoy Kundu
(74) *Attorney, Agent, or Firm*—Burns, Doane, Swecker & Mathis, L.L.P.

(57) ABSTRACT

Low-frequency duct noise is relatively difficult to deal with by passive methods such as porous duct lining. Reactive methods like expansion chamber are rather bulky, while compact resonators are to narrow-banded. This invention shows that a suitably stetched thin membrane backed by a slender cavity can achieve a satisfactory performance from low to medium frequencies over an octave band.

11 Claims, 11 Drawing Sheets

OTHER PUBLICATIONS

Jie Pan et al., "The Effect of Fluid–Structural Coupling on Sound Waves in an Enclosure—Theoretical Part", J. Acoust. Soc. Am., 1990, pp. 691–707, vol. 87, No. 2, Acoustical Society of America.

K.S. Sum et al., "A Study of the Medium Frequency Response of Sound Field in a Panel–Cavity System", J. Acoust. Soc. Am., 1998, pp. 1510–1519, vol. 103, No. 3, Acoustical Society of America.

L. Cheng, "Fluid–Structural Coupling of a Plate–Ended Cylindrical Shell: Vibration and Internal Sound Field", Journal of Sound and Vibration, 1994, pp. 641–654, vol. 174, No. 5, Academic Press Limited.

E. H. Dowell et al., "Acoustoelasticity: General Theory, Acoustic Natural Modes and Forced Response to Sinusoidal Excitation, Including Comparisons with Experiment", Journal of Sound and Vibration, 1977, pp. 519–542, vol. 52, No. 4.

* cited by examiner (A)

Solve the dynamics Eq.(22) as part of the Galerkin procedure $$\begin{bmatrix} Z_{11}+L_1 & Z_{12} & \cdots & Z_{1N} \\ Z_{21} & Z_{22}+L_2 & \cdots & Z_{2N} \\ \vdots & \vdots & \ddots & \vdots \\ Z_{N1} & Z_{N2} & \cdots & Z_{NN}+L_N \end{bmatrix} \begin{bmatrix} V_1 \\ V_2 \\ \vdots \\ V_N \end{bmatrix} = -\begin{bmatrix} I_1 \\ I_2 \\ \vdots \\ I_N \end{bmatrix}.$$

where $L_j = mi\omega + \dfrac{T}{i\omega}\left(\dfrac{j\pi}{L}\right)^2$, $I_j = \int_0^1 p_i \sin(j\pi\xi)d\xi$ and $p_i = e^{-ik_0 x}$, to obtain $V_j, j = 1,2,3,...$ Find the reflection wave from $V_j$ according to Eqs. (27) and (28), shown below, $$p_r = \dfrac{p_{+rad}|_{n=0, x\to -\infty}}{e^{ik_0 x}} = \dfrac{1}{2}\int_{-L/2}^{+L/2} V(x')e^{-ik_0 x'}dx'$$

$$= \dfrac{1}{2}\sum_{j=1}^{\infty} V_j \int_{-L/2}^{L/2} \sin(j\pi\xi')e^{-ik_0 x'}dx'.$$

and the transmitted wave from Eq. (24), $$p_t = p_{+rad}|_{n=0, x\to +\infty} + p_i = \dfrac{1}{2}\int_{-L/2}^{+L/2} V(x')e^{ik_0 x'}dx' + 1$$

$$= \dfrac{1}{2}\sum_{j=1}^{\infty} V_j \int_{-L/2}^{L/2} \sin(j\pi\xi')e^{ik_0 x'}dx' + 1.$$

Hence the transmission loss from Eq. (25) is calculated as
$TL = -20\log_{10}|p_t|$.

METHODS FOR DESIGNING A CHAMBER TO REDUCE NOISE IN A DUCT

FIELD OF THE INVENTION

This invention relates to method for determining at least one parameter for the design of a least one chamber including a tensioned membrane to reduce noise in a duct.

BACKGROUND OF THE INVENTION

Porous media have been the backbone of almost all dissipative noise abatement techniques. This may be a mature and reliable technique which works for a very broad frequency band. But there may be two drawbacks.

Firstly, existing sound absorption techniques may be ineffective in the low frequency range, such as that below 200 Hz. This range is also often over-looked due to its low A-weighting. Nevertheless, the actual power of noise radiation from, say, a fan, is often highest in this frequency range.

Secondly, there has been increasing concern about the deposition and accumulation of dusts in the pores of the porous material. A periodical cleaning of the lining would be rather costly and indeed tedious. In fact, there are already public concerns of bacteria breading in the centralized ventilation systems of ordinary commercial buildings. The use of porous material for noise or heat insulation purposes might have contributed to an indoor air quality which is often worse than outdoors. There are also places such as operation theatres, where high hygienic requirement forbids the use of such materials.

The need of controlling low frequency noise in an environment friendly manner calls for a fiberless approach. A team of acousticians led by Fuchs (2001a) utilized microperforated sheets for sound absorption, and impervious thin membranes for separating the harsh environment from acoustic elements like resonators (Fuchs 2001b). Active control techniques are also implemented, albeit in the simplest and most practical fashion. The construction of such microperforated sheets may be relatively complicated leading to high fabrication and maintenance costs.

OBJECTS OF THE INVENTION

Therefore, it is an object of this invention to resolve at least one or more of the problems as set forth in the prior art. As a minimum, it is an object of this invention to provide the public with a useful choice.

SUMMARY OF THE INVENTION

Accordingly, this invention provides a method of designing a chamber for attachment of a duct to reduce noise in said duct. Such a chamber has a peripheral chamber height $h_c$ to reduce noise in a duct having a height h by. The duct is separated from the chamber by a membrane having a tension T and membrane length L. The steps include:

a) setting the chamber height $h_c$, the membrane length L, and tension T to predetermined values;

b) setting incident wave frequency $f$ such that angular frequency $\omega=2\pi f$, $c_o$=speed of sound;

c) determining the radiation pressure acting on the upper surface of the membrane facing away from the chamber, $p_{+rad}$ caused by vibration of a unit modal amplitude;

d) determining the radiation pressure acting on the lower surface of the membrane facing towards the chamber, $p_{-rad}$ caused by vibration of a unit modal amplitude;

e) determining the radiation pressure by reflection of the radiated waves into the cavity by the walls of the chamber, $p_{-ref}$ caused by vibration of a unit modal amplitude;

f) calculating vibration amplitude of the jth in-vacuo mode $V_j$ using the modal impedance yielded from $p_{+rad}$, $p_{-rad}$, and $p_{-ref}$;

g) calculating reflected wave $p_r$ and transmitted wave $p_r$ using calculated vibration amplitude $V_j$ from step f);

h) calculating transmission loss TL for $f$;

i) repeating steps b) to h) by varying wave frequency $f$ to calculate transmission loss TL for different $f$; and j) determine a frequency range $f_1$ and $f_2$ from the transmission loss TL versus $f$ spectrum such that transmission loss TL within $f_1$ to $f_2$ is higher than or equal to a threshold transmission loss $TL_{cr}$ and wherein at the one of the chamber height $h_c$, membrane length L or tension T are varied and steps a) to j) are repeated to obtain an optimized noise-reduction spectrum for said duct.

Optionally, to determine an optimal tension $T_{opt}$, steps a) to j) are repeated as step k) by varying the tension T. The tension T may be varied from 0 to $p_o c_o^2 h^2$, $p_o$=fluid density of the medium contained in the duct.

Additional, steps a) to k) may then be repeated by varying the chamber height $h_c$ to determine optimal chamber height $h_{copt}$. Alternatively, steps a) to k) may be repeated by varying membrane length L to determine optimal membrane length $L_{opt}$.

Preferably, the wave frequency $f$ is varied from 0 to $\frac{c_0}{2h}$ such that the angular frequency $$\omega = 2\pi f = 0 \text{ to} \frac{\pi c_0}{h}, \quad c_0 = \text{speed of sound.}$$

$c_o$=speed of sound.

Additionally, The chamber may be filled with either air or with helium.

Preferably, the threshold transmission loss $TL_{cr}$ is $$10\log_{10}\left[1 + \frac{1}{4}\left\{\left(1 + \sqrt{6h_c L}\right) - \left(1 + \sqrt{6h_c L}\right)^{-1}\right\}^2\right].$$

More preferably, the treshold transmission loss $TL_{cr}$ is 10 dB.

It is another aspect of this invention to provided a chamber attaching to a duct having a height h for reducing noise in said duct, including a peripheral chamber height $h_c$ and membrane length L, and a membrane having a tension T separating said chamber from said duct, wherein any one of the chamber height $h_c$, the membrane length L, or the tension T is set to an optimal value determined by the above methods.

BRIEF DESCRIPTION OF THE DRAWINGS

Preferred embodiments of the present invention will now be explained by way of example and with reference to the accompany drawings in which.

DETAILED DESCRIPTION OF THE PREFERRED EMBODIMENT

Figure 1:
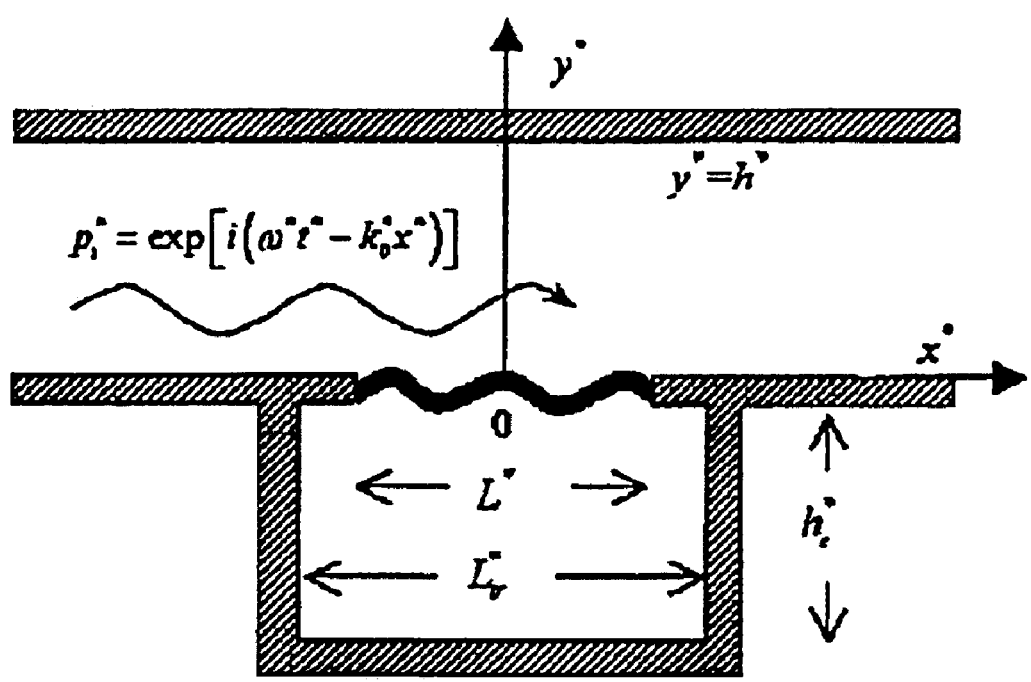
FIG. 1 shows a cross-section view of the noise-reduction chamber of this invention.

This invention is now described by way of example with reference to the figures in the following paragraphs. List 1 contains a list of symbols used in this specification so that such may be easily referred to.

Objects, features, and aspects of the present invention are disclosed in or are obvious from the following description. It is to be understood by one of ordinary skill in the art that the present discussion is a description of exemplary embodiments only, and is not intended as limiting the broader aspects of the present invention, which broader aspects are embodied in the exemplary constructions.

In the field of architectural acoustics, analytical efforts have been made to predict the acoustic performance of such panels. For example, Kang and Fuchs (1999) successfully treated the problem of microperforated membrane as a parallel connection of the (impervious) membrane and apertures. This is a locally reactive model which nevertheless reveals most of the essential physics. Frommhold et al (1994) described the acoustic performance of a splitter silencer made by a host of combined Helmholtz and plate resonators. The analysis is again carried out on the basis of locally reactive model based on the normal incidence impedance of a single resonator. Using the Helmholtz integral formulation, Horoshenko & Sakagami (2001) studied sound reflection and absorption by a finite, poroelastic plate in an infinite rigid baffle. The plate is supported by a shallow cavity which is filled with sound absorption materials. The cavity is infinite in the direction parallel to the panel. The analytical method employed in this study is rigorous, but the configuration differs from that of the present study where the cavity is enclosed. A recent study conducted by Mechel (2001) dealt with both locally reactive and bulk reactive poroelastic panels supported by an enclosed cavity.

In this invention, instead of using a thin membrane (such as aluminium around 0.1 mm thickness) in its naturally relaxed state, the use of such membranes under high tension is explored. It is found that a grazing incident noise induces the tensioned membrane to vibrate in low-order modes, and such vibration may reflect low-frequency noise effectively. It is also found that the tension of the membrane T, the chamber height $h_c$, and the chamber length L may determine the noise-reduction properties of the chamber designed by the method of this invention.

THEORECTIAL MODELING

The acoustic elements in the present theoretical model are entirely reactive without any sound absorption material, nor microperforation, although some mechanism of energy dissipation always exists in all experimental rigs. As it turns out, the level of tensile stress required to produce a broadband performance may approach the elastic limit of common materials like aluminum. For this reason, the device is tentatively called a 'drum silencer'. It reflects noise without causing any extra pressure loss like normal vehicle exhaust silencer or splitter silencers commonly used in the ventilation systems.

The theoretical modeling in studies related to the interaction of sound and flexible walls has been steadily built up during the past three decades or so. Research in this area has been motivated by a diverse range of engineering problems which include, but are not limited to, aerospace, underwater and room acoustics applications. For example, Lyon (1963), Pretlove (1965), and Guy (1979) studied the effect of a plane flexible wall on the transmission of sound into rooms or cavities. Pan & Bies (1990), and Sum & Pan (1998) investigated the effect of flexible walls on the reverberation performance of rooms. Cheng (1994) investigated the coupling of sound with cylindrical shells simulating aircraft cabins, the purpose being to identify the noisiest structural modes for the acoustic comfort of the cabin. Dowell & Voss (1963), and Dowell el al. (1977) studied the stability of a cavity-backed panel exposed to external flows. In all these studies, the pressure on the internal panel surface, i.e. the side facing the cavity, is expanded in terms of the normal cavity modes, and the excitation pressure on the external panel surface is prescribed. In most cases, the cavity air modifies the panel vibration and the mode is said to be panel-controlled. On the other hand, when the cavity is very shallow and the excitation frequency is low, the cavity becomes stiffer than the panel, the latter then acts merely as an added mass to the room acoustics mode. This scenario is often categorized as 'strong' fluid-structure interaction when one chooses to regard such modified room modes as an eigen mode of the panel, see, for example, (Pretlove 1965). The radiation pressure on the external panel surface is either ignored or lumped into a prescribed excitation force. The validity of such simplification, and the dominance of either fluid or structure in modified modes of resonance, are in fact characteristic of weak coupling in the context of the present studies.

The structure used in the current model is a thin membrane with negligible bending stiffness. It is found here that the panel-controlled or cavity-controlled resonance tends to be ineffective as far as the reflection of grazing incident wave is concerned. Another departure of this study from the previous literature is that the radiation pressure on the membrane surface external to the cavity is fully coupled with the membrane motion. This fluid loading is found to be equally important as the acoustic response inside the cavity.

Compared with all the related studies mentioned above, the theoretical model and the solution method described in the present article have the following distinct features: (a) the membrane and the cavity are finite but not compact; (b) there is no simplification assumption made regarding the radiation pressure on either side of the membrane; (c) the pressure on the panel surface facing the cavity is expressed in terms of the duct acoustics modes instead of the room acoustics modes. Multiple resonant peaks are found and, when an appropriate combination of cavity and membrane properties are chosen, the breakdown of transmission loss between these peaks is moderate, and a level of 10 dB is sustained for a continuous frequency range wider than an octave band. This represents an attractive performance considering the fact that an expansion chamber of the same cavity size yields a maximum transmission loss of 5 dB when it experiences a quarter wavelength resonance. The following paragraphs will outline the analytical formulation for the membrane response to a grazing incident wave.

The essential components of the noise reduction system designed by this invention is shown in FIG. 1. It has a duct, or channel, of height h, lined in part by a membrane of length L on the lower wall. The membrane is simply supported at the two edges, and is enclosed by a rigid-walled cavity of depth $h_c$ and length $L_v$. $L_v$ is held equal to L in the numerical example to be given later, but a general formulation for $L_v > L$ is sought for the sake of parametric studies on the shape of the cavity. The flexible wall has a mass per unit length m and a tensile force T is applied.

Figure 2A:
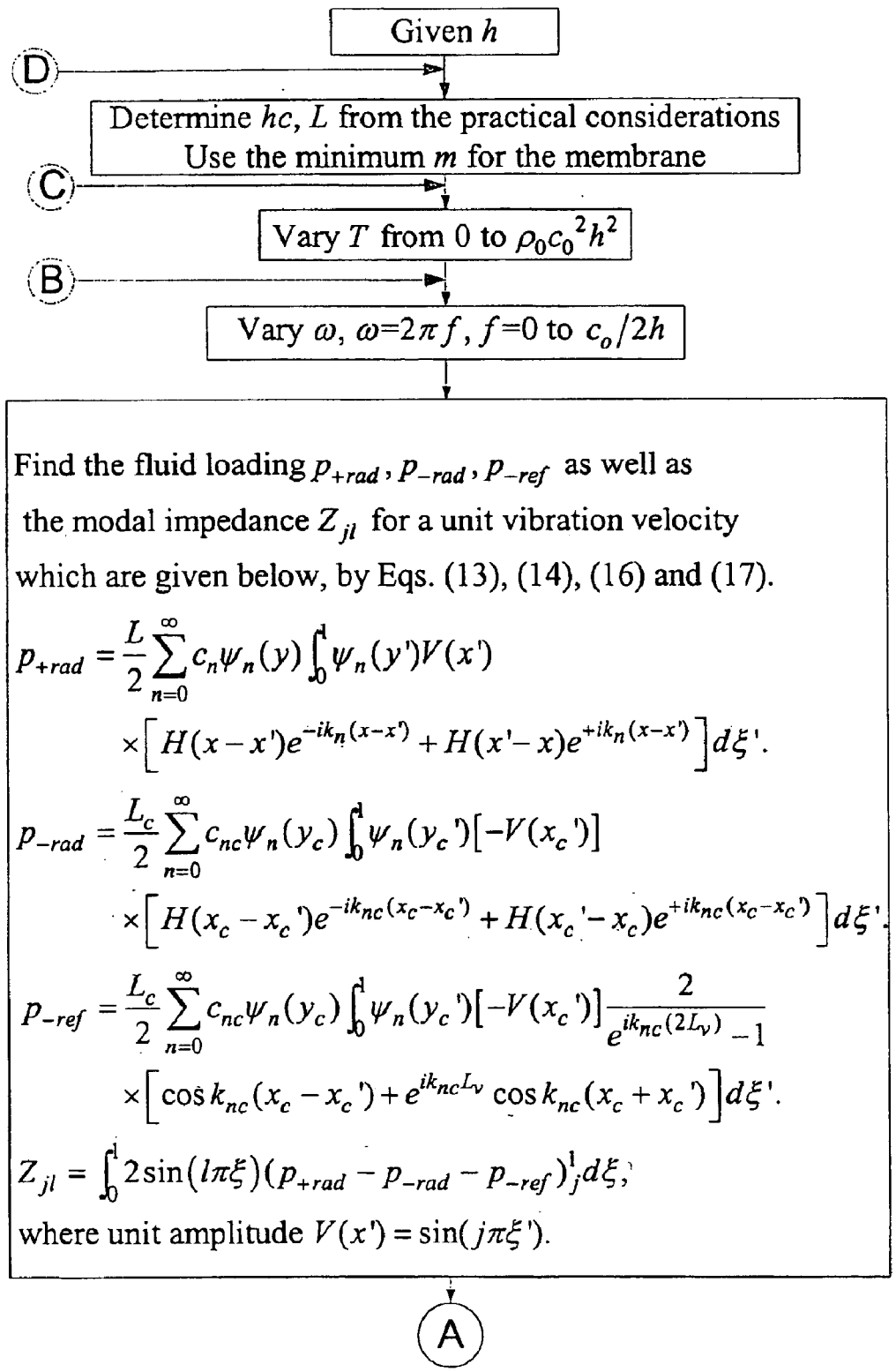
FIG. 2 shows a flow chat for the design of the noise-reduction chamber.
Figure 2C:
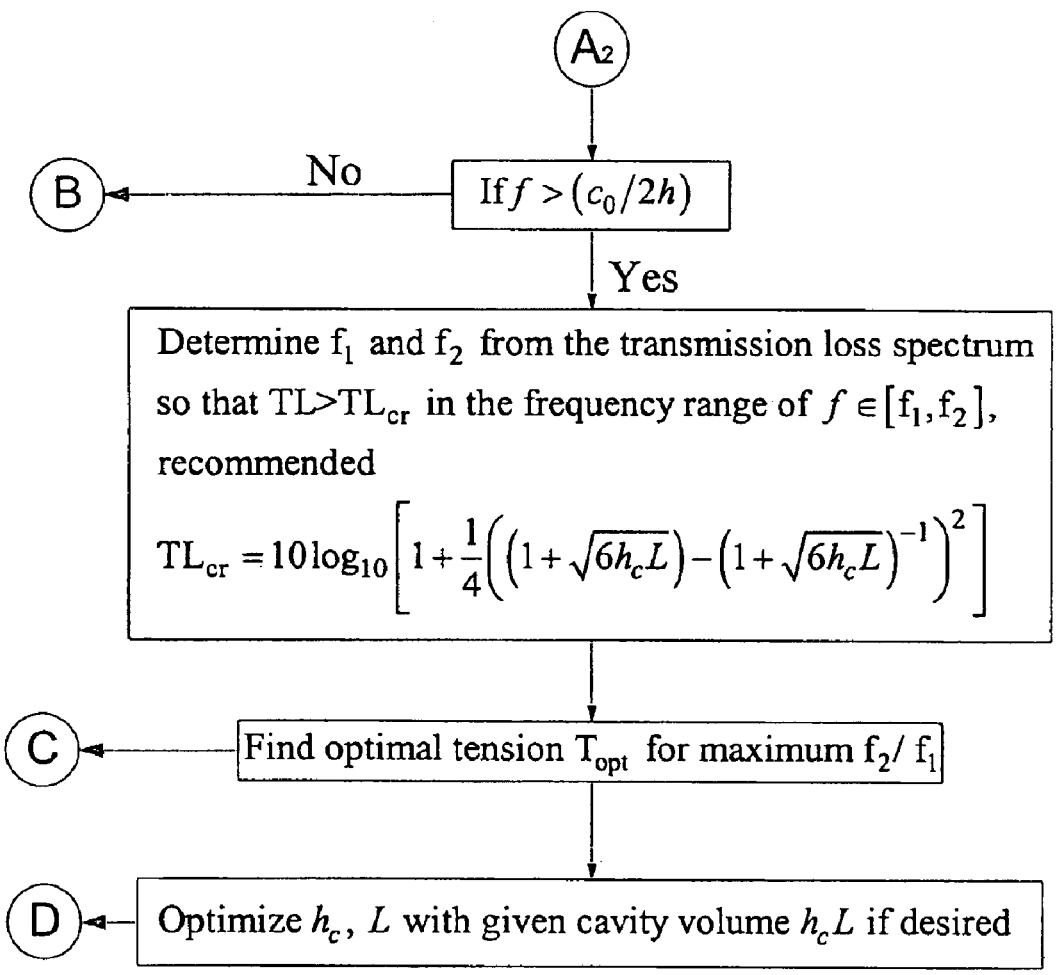

FIG. 2 shows the flow chart in determining an optimal parameter for the design of the chamber. The parameter may include any one of the chamber height $h_c$, membrane length L or tension T. For example, the optimal tension T can be determined for particular chamber height $h_c$, membrane length L. This may be particular example where the size of the chamber may be restricted by practical issues like the space available for the construction of such a chamber. Of course, there may be cases that the membrane volume $Lh_c$ and the tension T are fixed, and our mission is to determine the optimal chamber height $h_c$.

According to FIG. 2, the steps involved in finding an optimal parameter to design a noise-reduction chamber of this invention may be as follows:

Step 1

Setting the height of the duct h, which sets the basic noise characteristic, that is, the possible noise propagation modes, of the duct in concern.

Step 2

Setting the chamber height $h_c$, and the membrane length L to predetermined values. These two parameters are set at this stage as they are typically restricted by the installation environment.

Step 3

Setting the membrane tension T. As T is the typical value to be optimized, this value is varied at this stage, preferably from 0 to $p_o c_o^2 h^2$, $c_o$=speed of sound and $p_o$=fluid density. The upper limit $p_o c_o^2 h^2$ is normally sufficient, but it can be increased further under certain geometric conditions. Therefore, the upper limit of to $p_o c_o^2 h^2$ for T may be entirely optional.

Step 4

Setting the incident wave frequency $f$, which may be varied from 0 to the cut-on frequency $$\frac{c_0}{2h}.$$

Accordingly, the angular frequency $$\omega = 2\pi f \text{ varies from } 0 \text{ to} \frac{\pi c_0}{h}.$$

Theoretically, there is no upper limit for the highest noise frequency $f$. However, noise of frequency higher than $$\frac{c_0}{2h}$$

might be dealt with effectively by traditional sound absorption method, such as duct lining.

Step 5

Having the values set in the above stages, we follow the Galerkin procedure to find the membrane vibration velocity V(x) which can be decomposed into in-vacuo vibration modes. To begin with, modal impedance should be found by setting the amplitude of each in-vacuo vibration mode to be unity. Here, modal impedance of matrix $\{Z_{jl}\}$ is defined as the lth modal coefficient of the fluid loading induced on the membrane by the jth membrane vibration of unit amplitude. The radiation pressure acting on the upper surface of the membrane facing away from the chamber, $p_{+rad}$, the radiation pressure acting on the lower surface of the membrane facing towards the chamber, $p_{-rad}$, and the radiation pressure by reflection of the radiated waves into the cavity by the walls of the chamber, $p_{-ref}$ are determined by the following mathematical equations:

$$p_{+\text{rad}}(x, y) = \frac{L}{2} \sum_{n=0}^{\infty} c_n \psi_n(y') V(x') \times \quad \text{Equation 1}$$

$$\left[ H(x-x')e^{-ik_n(x-x')} + H(x'-x)e^{+ik_n(x-x')} \right] d\xi'$$

$$p_{-\text{rad}}(x_c, y_c) = \frac{L_c}{2} \sum_{n=0}^{\infty} c_{nc} \psi_n(y_c) \int_0^1 \psi_n(y_c')[-V(x_c')] \times \quad \text{Equation 2}$$

$$\left[ H(x_c-x_c')e^{-ik_{nc}(x_c-x_c')} + H(x_c'-x_c)e^{+ik_{nc}(x_c-x_c')} \right] d\xi'$$

$$p_{-\text{ref}}(x_c, y_c) = \frac{L_c}{2} \sum_{n=0}^{\infty} c_{nc} \psi_n(y_c) \int_0^1 \psi_n(y_c')[-V(x_c')] \times \quad \text{Equation 3}$$

$$\frac{2}{e^{ik_{nc}(2L_v)}-1} [\cos k_{nc}(x_c-x_c') + e^{ik_{nc}L_v} \cos k_{nc}(x_c+x_c')] d\xi.$$

where $V=\sin(j\pi\xi^1)$ is the specified modal vibration velocity of a unit amplitude, and $$x_c = \frac{x^*}{h_c^*}, \quad y_c = \frac{y^*}{h_c^*}, \quad L_c = \frac{L^*}{h_c^*}, \quad L_v = \frac{L_v^*}{h_c^*}, \quad \omega_c = \frac{\omega^* h_c^*}{c_0^*} = \omega h_c,$$

$$c_{nc} = \frac{i}{\sqrt{(n\pi/\omega_c)^2 - 1}}, \quad k_{nc} = \frac{\omega_c}{c_{nc}}.$$

The symbols used in these equations can be referred to in List 1.

With $p_{+rad}$, $p_{-rad}$, and $p_{-ref}$ calculated, the modal impedance $Z_{jl}$, lth modal coefficient of fluid loading caused by a prescribed jth mode vibration of unit amplitude, can be calculated by the equation:

$$Z_{jl} = Z_{+jl} + Z_{-jl} + Z_{rjl} \quad \text{Equation 4}$$

$$= \int_0^1 2\sin(l\pi\xi)(p_{+rad} - p_{-rad} - p_{-ref})_j^l d\xi.$$

Equation 4

Step 6

Once the the modal impedance $Z_{jt}$ is found, the vibration amplitude of the jth in-vacuo mode $V_j$ can be calculated using the dynamics equation of the membrane vibration, which is decomposed into a set of linear equations for $N \geq 20$ in-vacuo modes as:

$$\begin{bmatrix} Z_{11} + \mathcal{L}_1 & Z_{12} & \dots & Z_{1N} \\ Z_{21} & Z_{22} + \mathcal{L}_2 & \dots & Z_{2N} \\ \vdots & \vdots & \ddots & \vdots \\ Z_{N1} & Z_{N2} & \dots & Z_{NN} + \mathcal{L}_N \end{bmatrix} \begin{bmatrix} V_1 \\ V_2 \\ \vdots \\ V_N \end{bmatrix} = -\begin{bmatrix} I_1 \\ I_2 \\ \vdots \\ I_N \end{bmatrix}. \quad \text{Equation 5}$$

Equation 5

Step 7

The reflected wave $p_r$ and transmitted wave $p_t$ can then be calculated using the equations below:

$$p_r = \frac{p_{+rad}|_{n=0, x \to -\infty}}{e^{ik_0 x}} = \frac{1}{2}\int_{-L/2}^{+L/2} V(x')e^{-ik_0 x'} dx' \quad \text{Equation 6}$$

$$= \frac{1}{2}\sum_{j=1}^{\infty} V_j \int_{-L/2}^{L/2} \sin(j\pi\xi')e^{-ik_0 x'} dx'.$$

Equation 6

$$p_t = p_{+rad}|_{n=0, x \to +\infty} + p_i = \frac{1}{2}\int_{-L/2}^{+L/2} V(x')e^{ik_0 x'} dx' + 1 \quad \text{Equation 7}$$

$$= \frac{1}{2}\sum_{j=1}^{\infty} V_j \int_{-L/2}^{L/2} \sin(j\pi\xi')e^{ik_0 x'} dx' + 1.$$

Equation 7

It should be note that $p_r$ is not required to obtain the optimized parameters, which will be detailed in the following steps. $p_r$ is calculated regardless to study the variation of $\beta$.

Step 8

With the transmitted wave $p_t$ now known, the transmission loss TL can now be calculated by:

TL=$-20\log_{10} p_t$ (eg. no. to be filled in later)

This calculated transmission loss TL is then recorded.

Step 9

Repeating Steps 4 to 8 by varying the incident wave frequency $f$ as described previously to determine the transmission loss TL for each frequency within the range of frequencies desired.

Step 10

Using the transmission loss TL versus the incident wave frequency $f$ spectrum obtained from the above Steps 3 to 9, determine whether the transmission loss TL is above a particular threshold transmission loss $TL_{cr}$, which can be any particular value as desired.

Preferably, the threshold transmission loss $TL_{cr}$ can be $$10\log_{10}\left[1 + \frac{1}{4}\left\{\left(1 + \sqrt{6h_c L}\right) - \left(1 + \sqrt{6h_c L}\right)^{-1}\right\}^2\right].$$

This value is the peak transmission loss of an expansion chamber made of two rectangular cavities which, when put together, form a cubic (square in 2 D) cavity of volume 3 times the total volume occupied by the drum silencer cavities. The frequency range in which TL satisfies the condition of $TL \geq TL_{cr}$ continuously is defined as the stopband, denoted as $[f_1, f_2]$.

Accordingly, each membrane tension T will have a frequency range from $f_1$ to $f_2$ where the transmission loss TL is higher than the threshold transmission loss $TL_{cr}$. However, a designer could choose to tolerate occasional breach of the requirement of $TL \geq TL_{cr}$ within the frequency band.

Step 11

Repeating Steps 3 to 10 with a different membrane tension T from 0 to $p_o c_o^2 h^2$ as explained earlier.

Step 12

The above Steps 2 to 11 may be repeated if the parameters chamber height $h_c$, and the membrane length L are to be optimized. The variation of the values of chamber height $h_c$, and the membrane length L shall be determined by the real installation environment.

These equations and theory involved were described in detail in the articles entitled "Modal analysis of a drumlike silencer" by the inventors (J. Acoust. Soc. Am. 112(5), Pt. 1, Nov. 2002), for which the content is now incorporated as reference. It should be noted the above equations are known and described in the references of "Modal analysis of a drumlike silencer". It should be noted that the above equations, and the equations described throughout the description can be calculated by existing commercial software package such as SYSNOISE™. Further, the radiation pressures $p_{+rad}$, $p_{-rad}$, and $p_{-ref}$ may be calculated by other equations if later studies reveal improved calculation methods.

The optimization of the parameters membrane tension T, chamber height $h_c$, and the membrane length L may not be known before this invention, even though the methods to obtain various components used in the method of this invention, like the radiation pressures $p_{+rad}$, $p_{-rad}$, and $p_{-ref}$, may be known. Working examples verifying the above method will be detailed in the following sections.

EXPERIMENTAL SETUP

Figure 3:
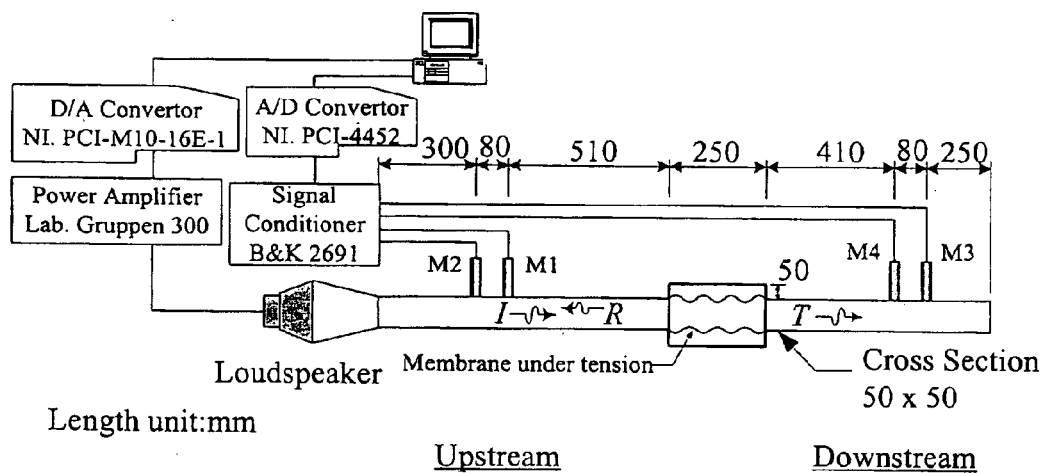
FIG. 3 shows an experimental setup to measure the transmission loss of the noise-reduction chamber.

As shown in FIG. 3, the transmission loss across the drum silencer is measured by the four-microphone, two-load method similar to the one described by Munjal & Doige (1990), and the resolution of the standing wave pattern follows the principle described by Chung & Blaser (1980). The incident noise is simulated by a loudspeaker connected to the duct through a contraction cone. A digital-to-analogue conversion card (PCI-M10-16E-1 from National Instruments) is used to generate the signal which is amplified by one of B&K's amplifiers (Lab Gruppen 300). Two pairs of ½ inch, phase-matched microphones (B&K type 4187) are used together with conditioning amplifier (B&K's Nexus 2691). The separation distance for each pair is 8 cm. The large separation is chosen to reduce experimental error at low frequencies up to 1500 Hz. Signals from the four microphones, labelled M1 through to M4, are digitized by the National Instruments card PCI-4452 at the sufficient sampling rate of 16 kHz. Both A/D and D/A processes are controlled by National Instruments' Labview programme and the test is run by a loop of discrete frequencies from 20 Hz to 1.5 kHz with an increment of 10 Hz for each step. The discrete frequency approach is preferred since it offers opportunities to adjust the loudspeaker volume at 'nodal' frequencies where the output can be very low. Since the frequency of the incident wave is accurately controlled by the Labview programme, the length of each sample can be tailor-made to be an integer number of cycles, eliminating any possible spectral leakage through the use of digital windowing technique. The programme can also be run with random noise measurement, but it is felt that the time required to scan through the whole frequency spectrum is acceptable thanks to the automatic looping function of the Labview code.

The exact locations of the microphones are shown in FIG. 3 with the length unit of mm. Before the two-load tests are conducted, microphones M2, M3, and M4 are calibrated against M1 by the swapping procedure despite the fact that all microphones are very well phase matched. The resultant variations of the amplitude ratio and phase angle difference with respect to frequency are fit to a polynomial curve and saved in files to be read by the Labview code which runs the two-load tests. The first test is conducted with the far end of the downstream section, where M3 and M4 are, filled with some sound absorption materials providing a partially anechoic termination. The second test is conducted without any sound absorption material. In both tests, the downstream end is terminated by a rigid plate so that the signal will not be contaminated by the background noise. The linear combination of the intensity fluxes for the two tests then gives a virtual test result in which the downstream is strictly anechoic.

The duct used in the tests has a square cross section of dimension h=5 cm. The two cavities also have the nominal cross section of 5 cm by 5 cm and the length is 25 cm. These dimensions can be adjusted by adding or retrieving some solid blocks in the rig. The first cut-on frequency in the duct is 3430 Hz. According to the prediction, the lower limit of the stopband frequency may be down to a dimensionless frequency of $fhlc_o$=0.05, or $f$=343 Hz. Such a frequency is not that low in the usual sense, but the general agreement reached between the experimental data and the theoreticalprediction gives reasonable confidence that noise reflection at a frequency below 100 Hz can be achieved for a duct with a height of 20 cm or so. The choice of the 5 cm duct in this experiment is partly based on the convenience of an existing rig. In contrast, the choice of the relatively large separation distances between the two junctions of the chamber housing the silencer and the nearest microphones is forced upon by the inconvenience of accommodating the external device required to apply and change the membrane tension. Account is taken of the damping of waves by the duct walls according to the well-known formula of complex wavenumbers (see Pierce 1991, Eqs 10–5.10 and 10–5.8):

$$k = \frac{\omega}{c_o} + (1+i)\alpha_{Walls}$$

$$\alpha_{walls} = 2^{-3/2}\sqrt{\frac{\omega\mu}{\rho_o c_o^2}}\left[1+\frac{\gamma-1}{Pr^{1/2}}\right]\frac{L_p}{A}$$

where $\mu$ is the air viscosity, $\gamma$ is the ratio of specific heats, Pr the Prandtl number, $L_p$ the perimeter, and A the cross sectional area. The energy loss has a square-root frequency dependency. Take 500 Hz as an example, friction for the present duct over 1 m gives around 5% loss in sound energy flux. Corrections for travelling wave amplitudes are made by finding out the 'true' incident and reflection waves at the left-hand side junction of the chamber from the sound intensities measured between M1 and M2. The same applies to the downstream. But the effect of friction inside the chamber is regarded as part of the damping mechanism of the silencer. No attempt is made to separate friction from other mechanisms such as the inevitable vibration of the so-called rigid walls of the cavity.

Figure 4:
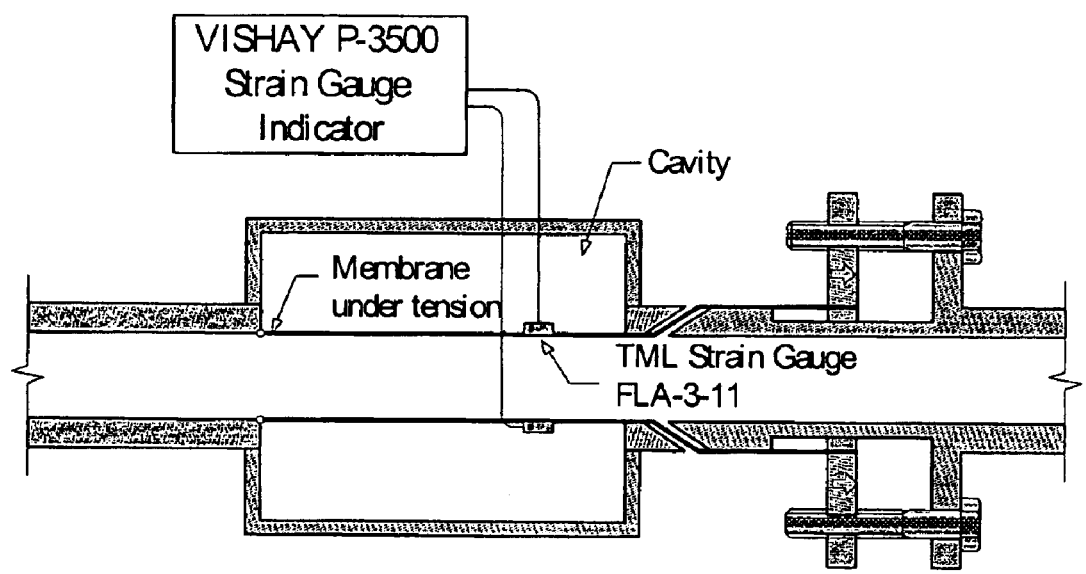
FIG. 4 shows the mechanism to measure the tension of the membrane.

The membranes are clamped and stretched by a mechanism shown in FIG. 4. The upstream end of the membrane is simply fixed by wrapping it around a cylinder of 6 mm in diameter and pressed against the junction walls. The downstream end of the membrane runs through a 0.05 mm slit, which is exaggerated in the figure, to be fixed by two plates outside the duct. The axial positions of these clamp plates, hence the strain in the membrane, are easily adjusted by the screws shown in the figure. The tensile force applied is measured by a strain gauge glued to the surface of the membrane in the test section. The dimension of the strain gauge sensor (TML FLA-3-11) is 3 mm and its attachment is believed to cause no noticeable influence on the dynamics of the stretched membrane. However, since the membrane used is thinner than the epoxy used to attach the strain gauge, significant measurement uncertainties may occur. To eradicate this problem, a calibration procedure is undertaken by attaching dead weights to the membrane through some connection joints in the upright position.

In the direction perpendicular to the figure, say, z, the two edges of the membranes (of width 52 mm) are inserted into a very thin gap between the two constituent plates of the cavity walls. The gap is less than 0.5 mm and has a depth around 1–2 mm in the z direction. This is a deliberate attempt to simulate the two-dimensional theoretical model shown in FIG. 1. Tests were also conducted using a membrane narrower than 50 mm leaving a small gap between the membrane edges and the end walls, but results were quite similar. It is anticipated that, in real applications, these edges should be entirely glued, after the membrane has been stretched, to the end walls, for which a three-dimensional theoretical model should be used. Numerical and experimental results show that the 3 D effect is very minor in this case, and the transmission loss of the intended 2 D design is achieved even when the edges are glued with a small tension applied in the z direction. To take into account the 3 D effect, more complicated expressions for $p_{+rad}, p_{-rad}$, and $p_{-ref}$ are used. The complexity justifies the use of suitable software, such as matlab® and femlab® to substitute for this step, while the general procedure to find the ultimate membrane vibration and transmission loss described in this document is still followed.

Figure 5:
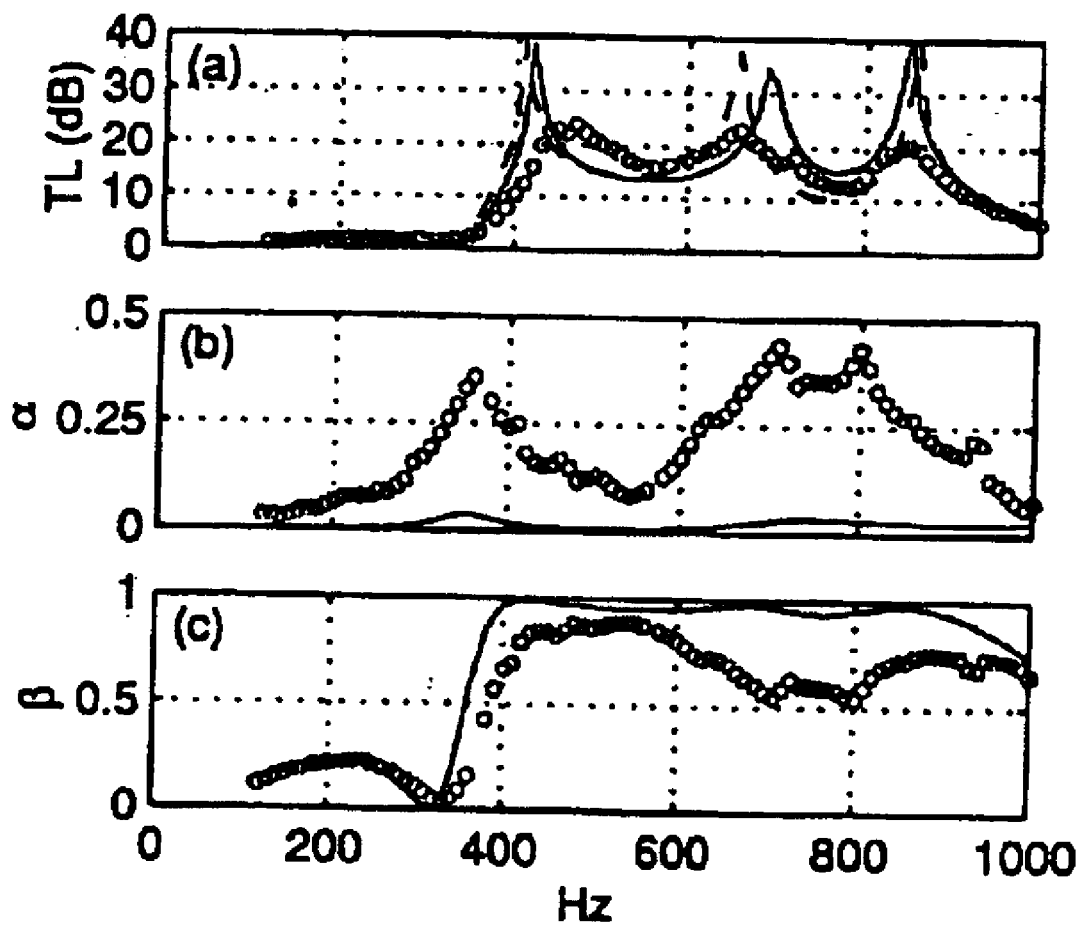
FIG. 5 shows a comparison of the transmission loss of the data measured in a duct of cross section 5 cm by 5 cm with the theoretical model with a stainless steel membrane under 190 N tension for (a) transmission loss TL; (b) absorption coefficient $\alpha$; and (c) reflection coefficient $\beta$.

When the membranes are removed and the slit allowing the membranes to get out of the duct is covered, the rig becomes a simple expansion chamber with an area expansion ratio of 3. The transmission loss is measured and compared with two theoretical predictions in FIG. 5. One is the plane-wave theory (dashed line), and the other is the present theory using 25 modes of the virtual membranes (solid line). It is found that the comparison between the experimental data with the present theory is better than that with the plane-wave approximation. The latter ignores the acoustic scattering at the junctions leading to two characteristic differences with reality. In reality, the frequency range of the lobes of the transmission loss is larger than $c_o/2L$, and the peak transmission loss is higher than that determined by the plane-wave theory. These are all captured correctly by the present theory. Having said that, the measured transmission loss is typically 0.5 dB higher than the theoretical prediction. This is probably caused by some energy dissipation mechanisms which are necessarily present in the rig but excluded in the theory. Apart from the damping by the sharp edges, such as the 6 mm cylinder used to clamp the membranes, one possible mechanism is the vibration of many constituent parts of the rig which is required to adjust the cavity size during the experimental study. When the same measurement system and procedure were used earlier in a single-piece circular expansion chamber, the discrepancy between the experimental data and the prediction using a finite element calculation was reduced to 0.2 dB at the nodal frequencies of the transmission loss lobes. Despite the finite discrepancy between the prediction and the experimental data, the test of the expansion chamber serves as a mini validation for both experimental set-up and the theory.

Results with stainless steel foil and copper foil membranes

Two membranes were used in the experiments, one stainless steel foil and one copper foil.

The predictions of the properties of the stainless steel membrane under 181 N tension is shown in FIG. 5(a) as the dashed line, and that under 190 N is shown as the solid line. The experimental data is shown as open circles.

Three peaks are found and the dip between the second and third peaks is right on the critical level of 10 dB. Study of the variation around this tension shows that the dip goes below 10 dB for a slightly lower tension, indicating that the tension does play a very subtle 30 role in setting the frequency interval between the spectral peaks. The dip remains above 10 dB for higher tension but the stopband of TL>10 dB is slightly narrower. The predicted stopband is $f\in[385,953]$Hz, while the experimental result is $f\in[398,935]$ Hz. The ratio of frequency limits, $f_2/f_1$, are 2.47 and 2.35, respectively. FIG. 5(b) compares the sound absorption coefficient, $\alpha$, and FIG. 5(c) shows the reflection coefficient of sound energy flux, $\alpha$. The following observations are made.

1. In agreement with the prediction, there are three distinct spectral peaks found within the experimental stopband. This means that the basic theoretical model is correct for the experimental rig.

2. The predicted TL curve has sharp peaks while that from the experiment is smoother. It means that there are significant energy dissipation mechanisms existing in the rig which are excluded from the theory. The experimental value of $\alpha$ ranges from 10% to 45% within the stopband, which is roughly 10 times higher than the predicted value with $\sigma=0.5\%$.

3. Also in agreement with theory, the experimental data shows that the mechanism of sound reflection dominates over sound absorption in the whole experimental stopband. As shown in FIG. 5(c), the prediction agrees with the experimental data almost perfectly below 300 Hz, which constituents the first small lobe.

Figure 6:
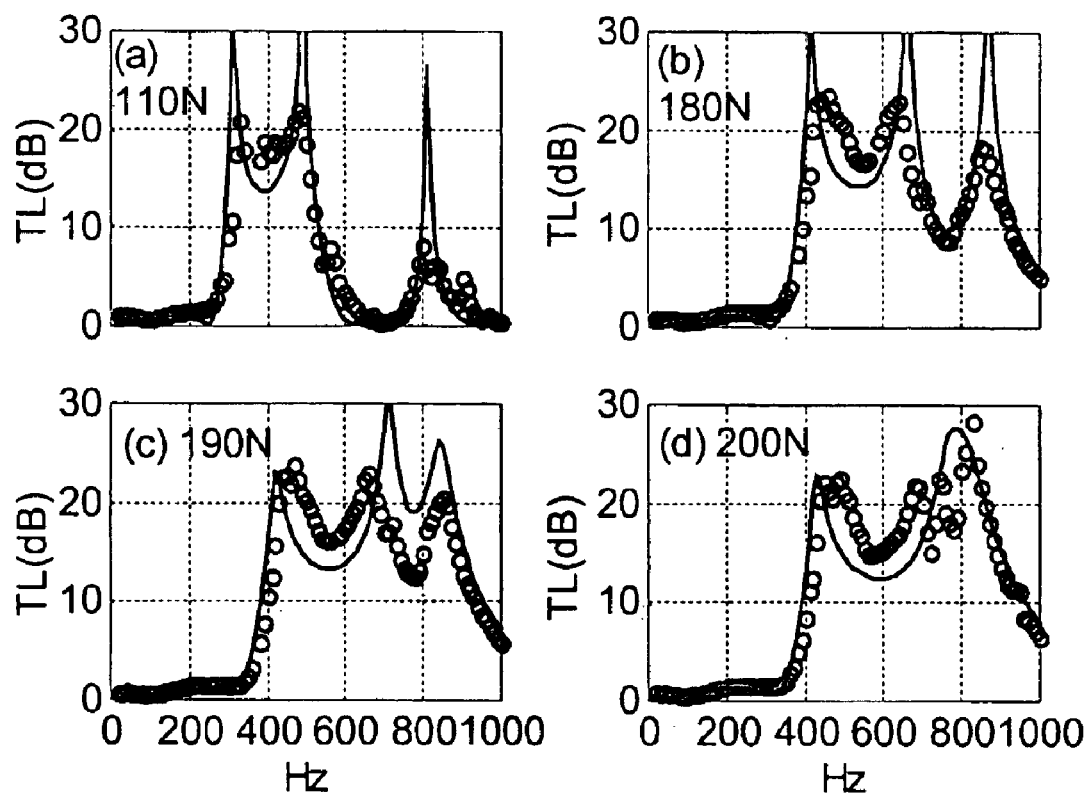
FIG. 6 shows a comparison of the transmission loss of the data measured in a duct of cross section 5 cm by 5 cm with the theoretical model with a stain-less steel foil with varied tension for (a) 110 N; (b) 180 N; (c) 190 N; and (d) 200 N.

The variation of transmission loss spectrum with respect to the membrane tension is shown in FIG. 6 for the thin stainless steel foil $$\left(\text{membrane mass ratio} = \frac{m}{\rho_o h} = 1.3\right).$$

Four spectra for 110, 180, 190, and 200 N are chosen for display. The experimental results (open circles) are compared with the theoretical modelling (solid lines). FIG. 6(a) is for the tension of 110 N. This is a typical situation where there are only two peaks in the stopband since the third one is too far away from the second. The theoretical modelling is seen to be rather successful except that the heights of all the peaks are overestimated. FIG. 6(b) is for 180 N, which is shown earlier to be close to the theoretical optimal value of 181 N. Although the second peak is rather close to the third, the breakdown between the two peaks is still too serious to qualify for a broadband performance under the strict criteria of TL>10 dB at all discrete frequencies. If one third octave band averaging is applied, as is done in most practical applications, this breakdown can be over-looked. The point to be emphasized here is that the spectral variation with respect to T is gradual in every sense, and the sudden change of the bandwidth with T is purely caused by the rigid definition of the stopband. The modelling in this case can also be classified as being successful given the fact that the peak frequencies cannot really be determined accurately with a two-dimensional theory. FIG. 6(c) is for 190 N and is analyzed in detail earlier. Comparing with the experimental spectrum in FIG. 6(b), the interval between the second and the third peaks of the experimental data is reduced, leading to a more balanced picture with a wider stopband. This change of pattern is captured rather accurately despite the two-dimensional approximation. FIG. 6(d) is for 200 N in which the second and third peaks from the experiment seem to merge together. The merge is more complete in the theoretical prediction in this case, consistent with the overprediction of the second peak frequency in all previous cases.

Figure 7:
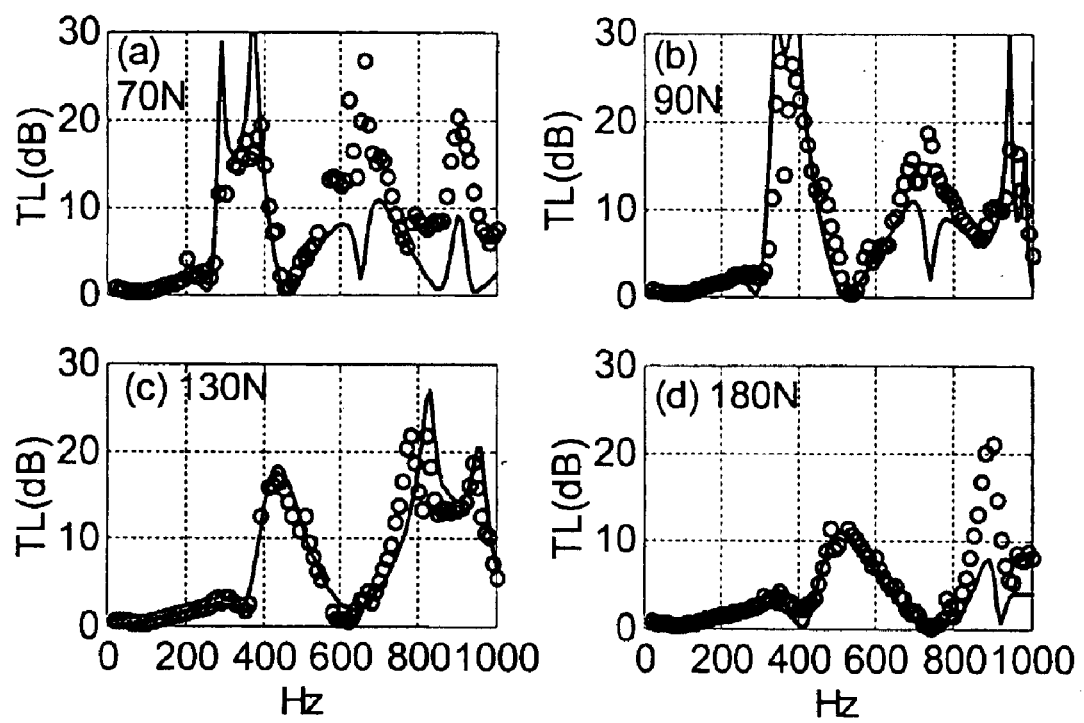
FIG. 7 shows a comparison of the transmission loss of the data measured in a duct of cross section 5 cm by 5 cm with the theoretical model with a copper foil with varied tension for (a) 70 N; (b) 90 N; (c) 130 N; and (d) 180 N.

Experiments using copper foil of thickness 0.03 mm were also conducted with less impressive results. This outcome is expected, but the results are also analyzed here to confirm the theoretical prediction of adverse effects of membrane mass. For this foil, the cavity was changed to a shorter and deeper one following the theoretical search for a reasonable performance for the heavy foil. The parameters are $h_c$=65 mm; $L_y$=L=198 mm; membrane mass ration=4.43. The results are compared with theoretical modelling in FIG. 7. FIG. 7(a) is for the tensile force of 70 N, and the data seems to be rather scattered relative to the theoretical modelling. The same phenomena are observed for tests with lower tension values such as 30 N and 50 N. This was found to be caused by the difficulty in setting up a uniform stress for the foil at such low tension. The agreement between theory and experiment becomes much improved for tests with higher tensile forces of 90 N, 130 N and 180 N in FIGS. 7(b), 7(c) and 7(d), respectively. Comparing the results from the lighter foil of stainless steel in FIG. 6, it is found that the heavier copper foil yields stopband in lower frequencies but the bandwidth is also narrower.

Results with helium-filled cavity

Using a similar setup as above, the performance of a noise-reduction chamber filled with helium is evaluated and compared with one filled with air The following set of parameters are used as the default values:

M=1.4, $h_c$=0.2, L=7

Figure 8:
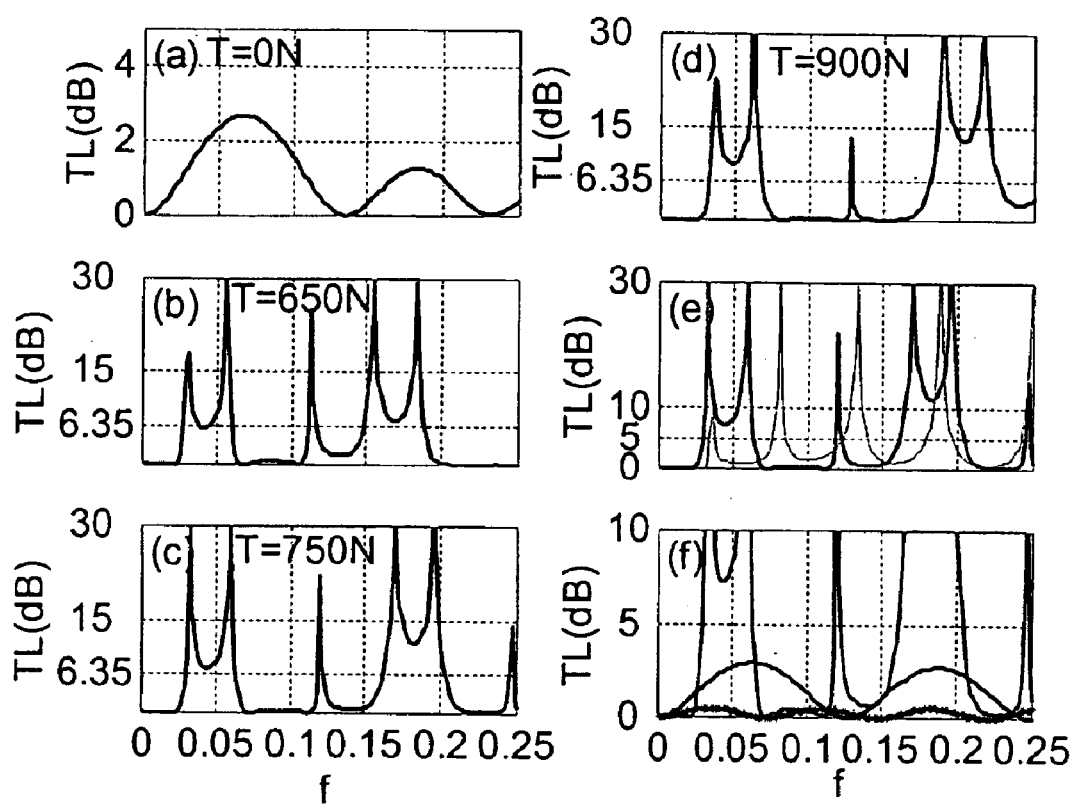
FIG. 8 shows the prediction of optimal performance of a helium-filled noise-reduction chamber (DHS) and its comparison with other reference configurations, with (a), (b), (c), and (d) compare the transmission loss for DSH with membrane tensions of T=0N, 650 N, 750 N(optimal) and 900 N; (e) compares the optimal DSH (thick line) with the air-filled noise-reduction chamber (DSA; thin line); (f) compares the optimal DSH (solid line) with expansion chamber with air (thin line) in the cavity (with the membrane removed theoretically)

The prediction result for the membrane with different tensions and the optimum result are shown in FIG. 8. The performance of the helium filled cavity is compared with that of normal air cavity of the same size. For easier comparison with experimental data, dimensional tension is indicated in the figure for the test rig of square cross section of h=100 mm. Many stopbands are found, but the attention is directed to the one with the lowest frequency. For the default total volume of the cavity A=2$h_c$, L=2.8, $TL_{cr}$=6.35dB.

When the tension is zero, as shown in FIG. 8(*a*), there is only inertia effect in the structural property. The spectral pattern is similar to that of a simple expansion chamber when the membrane is removed from the helium cavity. By comparing the frequency ratio $f_2 / f_1$, the dimensional optimum tension to achieve the best performance in the default configuration is found to be 750 N with $f_2 / f_1$=2.17 as shown in FIG. 8(*c*). When the tension is lowered to 650 N, the TL trough between the first and second peaks in FIG. 8(*b*) falls below $TL_{cr}$. When the tension is increased beyond 750 N, the frequency ratio becomes smaller as the first and second peaks close up. $f_2 / f_1$ is about 2.10 for 900 N.

Having found the optimum tension, 750 N, for the membranes backed by helium cavities (DSH), more detailed analysis can be carried out. First, comparison is made with the membranes in the air cavity with the same depth (DSA). FIG. 8(*e*) compares the optimal DSH with 750 N (thick line), and with DSA with 2870 N (thin line). The latter represents the best possible TL pattern for DSA although the best is also mostly below $TL_{cr}$=6.35 dB. By now it is apparent that helium cavity can enhance the transmission loss at low frequency. Such performance is attributed to the fluid loading in the cavity and this will be further discussed in the following section. As shown in FIG. 8(*f*), even when the membrane is removed, the TL of the expansion chamber with helium cavity (--) is much better than that with air cavity. The first TL lobe of the helium expansion chamber covers two TL lobes of the air expansion chamber. The width of the lobe is characteristic of a normal expansion chamber with a length of 3.9 h and the helium expansion chamber also gives much higher TL. This means that the helium cavity is equivalent to a deeper air cavity. FIG. 8(*f*) also compares the DSH (thick line) with the helium expansion chamber, the addition of the membrane is found to enhance the TL level at low frequencies.

Theoretical predictions show that the shallow DSH can control the low frequency duct noise by reflection. The stopband lies in the region of very low dimensionless frequencies. As frequency scales by $c_o$/h, noise of very low dimensional frequencies can be tackled if the cross section of the duct is large. Theoretical predictions like these need to be validated by experiment. Since any experimental rig is three dimensional in nature, the design to simulate the two-dimensional theoretical model should be conducted carefully. The crucial parts of the rig include the tension gear to apply tension uniformly across the third dimension, which is not included in the theoretical model, and the method to measure tension as well as the injection system of the helium gas without leakage from the test rig. The tests give transmission loss, reflection coefficient and absorption coefficient.

Using a similar setup as above and shown in FIG. 3, the performance of a noise-reduction chamber filled with helium is evaluated and compared with one filled with air The following set of parameters are used as the default values:

M=1.4, $h_c$=0.2, L=7

In order to keep the helium in the cavity separate from the main duct, a thin plastic membrane bag is used to contain the gas in an air-tight manner. The bag is called, respectively, air bag or helium bag when air or helium is filled into the bag. A cylinder of helium gas with 99% purity produced by a Hong Kong gas company was used. The density and sound speed of helium gas or other gases are obtained from (Icropera and Dewitt, 1996). The two cavities are 20 mm in depth. The plastic bag is made to a rectangular shape to fit into the cavity of 700 mm long and 20 mm deep. The mass per unit area of the plastic is 84 g/m².

A stainless steel foil of 0.025 mm thick is used in the experiment. The membrane is weighed, and the membrane mass per unit area is 0.17 kg/m². The mass ratio is M/($p_o$h)= 0.17/(1.225 ×0.1)=1.4 corresponding with the value above.

Figure 9:
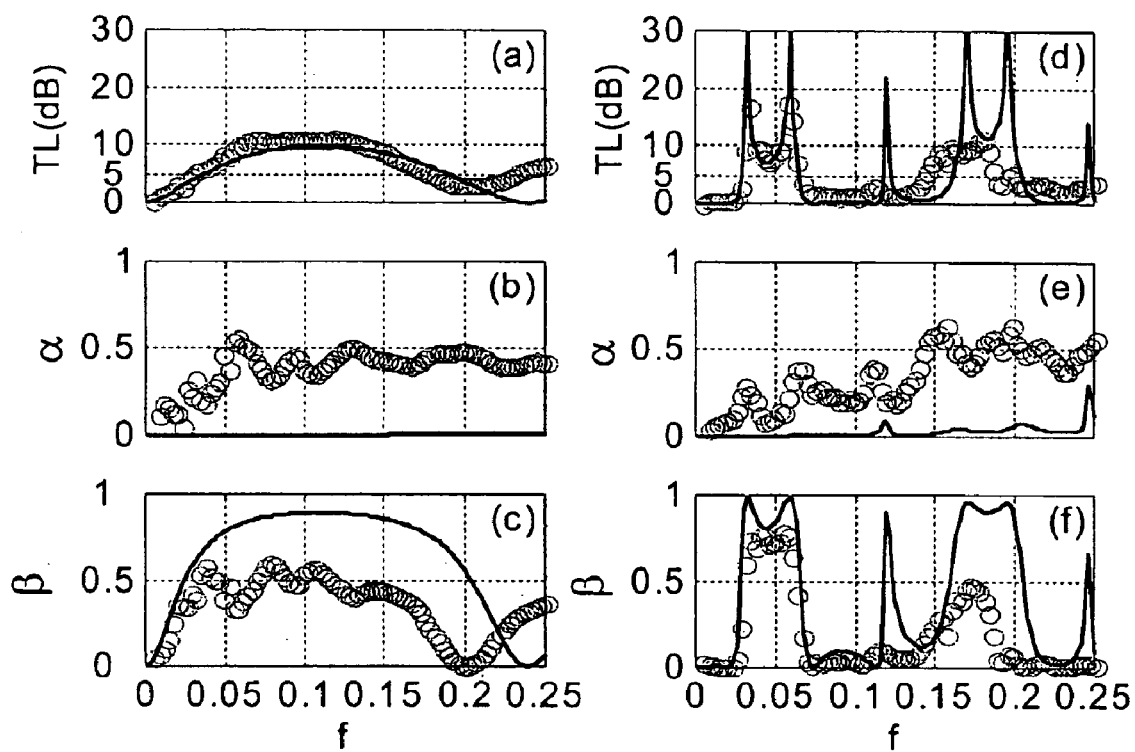
FIG. 9 shows the comparison of the experimental results (o) with theoretical predictions (—). The left column shows a chamber with helium cavity, but without membrane. The depth and length of cavity is h and 5h respectively. The right column is for the optimal DSH in the default configuration shown in FIG. 8.

The sub-figures on the left column of FIG. 9 give the experimental results of the helium expansion chamber. There is no metal membrane but the surface of the plastic bag is regarded as the plastic membrane. The dimension of this expansion chamber is not the same as the default values set as above. The depth of the cavity of this helium chamber is 100 mm, so the area ratio of the expansion chamber to the duct is 3. The length of the chamber is 500mm. The open circles represent the experimental result while the solid line is the theoretical prediction. Experimental results of TL in FIG. 9(*a*) show that the frequency range covered by the first lobe for the helium bag is smaller than prediction. The experimental results can be said to agree quite well with the theory below the frequency of 0.147. In between frequency 0.147 and 0.221, the theory overestimates. Since the maximum TL for a pure expansion chamber of an area ratio of 3 is only 4.4 dB, helium is seen to improve TL and the width of stopband. In FIG. 9(*b*), the energy loss in the experiment is found to be 45% on average, which takes away the contribution of the reflection coefficient shown in FIG. 9(*c*). Nevertheless, the main contribution to TL still derives from reflection, and the overall TL pattern in FIG. 9(*a*) still follows that of β shown in FIG. 9(*c*) instead of α shown in FIG. 9(*b*). The reason for the excessive level of a found in experiment is suspected to be the damping of the plastic bag which is under some tension during its inflation by helium. The maximum TL in the experimental result for the helium expansion chamber is found to be 10.6 dB and the peak is not very sharp. The trough goes down to 3 dB instead of 0 dB. The main finding is that both experiments and theory prove that helium can increase the effective depth of the cavity.

The right column in FIG. 9 is for the metal membrane with helium cavity, or DSH, at the optimal condition of T=750 N. Although there is metal membrane to separate two media in the cavity and the main duct, when the metal membrane is installed, the process of sucking the air out before the injection of helium tends to deform the metal membrane. Therefore, the plastic bag is still employed. Two remarkable peaks are found in the TL spectrum shown in FIG. 9(*d*). All predicted features are reasonably validated by the experimental data shown in open circles, although the peaks found in the experiment are smeared to lower values. The reason for the smearing is revealed by the plot of sound energy absorption coefficient α in FIG. 9(*e*). The experimental result basically matches the theoretical prediction based on an assumption of material loss factor for stainless steel $\sigma_1$=0.5% in the following equation. The corresponding stopband is frequency 0.03 to 0.064 and $f_2 / f_1$=2.13 for the experimental results, while the theoretical prediction is 2.16. Notice that the transmission loss between the second and third peaks is very small, a passband, and this band covers a very wide frequency range. The damping of the plastic bag and the friction between the surface of the plastic bag and the rigid wall of the cavity may have caused the deviation between the experiment and theory at higher frequencies beyond the 3$^{rd}$ peak. The absorption energy of the system is about 30% on average and this also causes the pattern of the reflection coefficient to deviate from the theoretical prediction. The main conclusion is that the performance of the DSH with shallow cavity can achieve good performance for the low frequency noise abatement.

Relatively impervious materials like aluminum foil can be used to keep helium or other desired gas within the chamber, and it is estimated that it would take about 10 years for a few percentage of the helium to escape through such a foil under normal atmospheric conditions. Further, the tension of the membrane may be maintained for an extensive period of time if the tension required is well below the limit of the material strength.

Other than helium or air, other gas which is lighter than the main working fluid, such as air, in the duct and is chemically stable may be used to fill up the chamber. In another words, the gas contained by the chamber is influenced by the main working fluid.

The experimental data may have shown the effectiveness of the method of this invention under different environments.

While the preferred embodiment of the present invention has been described in detail by the examples, it is apparent that modifications and adaptations of the present invention will occur to those skilled in the art. Furthermore, the embodiments of the present invention shall not be interpreted to be restricted by the examples or figures only. It is to be expressly understood, however, that such modifications and adaptations are within the scope of the present invention, as set forth in the following claims. For instance, features illustrated or described as part of one embodiment can be used on another embodiment to yield a still further embodiment. Thus, it is intended that the present invention cover such modifications and variations as come within the scope of the claims and their equivalents.

List 1

| | |
|---|---|
| $c_0$ | Isentropic speed of sound, 343 m/s |
| $c_n$ | Phase speed of the nth duct mode, defined as $\dfrac{ic_0}{\sqrt{(n\pi/k_0 h)^2 - 1}}$ in where i is unit imaginary number |
| $C_{nc}$ | Phase speed of the nth duct mode in the cavity |
| f | Frequency in Hz |
| $[f_1, f_2]$ | Frequency range in which the transmission loss is everywhere equal to or higher than a criterion value $TL_{ct}$ |
| h | Duct height |
| $h_c$ | Cavity depth |
| H | Heavside function $H(x - x') = 0$ when $x < x'$; $H(x - x') = 1$ when $x > x'$ |
| $I_j$ | Modal coefficient of incident wave |
| j | Vibration mode where j = 1, 2, 3 . . . |
| $k_n$ | Modal wavenumber, defined as $\omega/c_n$ |
| $k_{nc}$ | Modal wavenumber of the medium in the cavity |
| $k_0$ | Real wavenumber, defined as $k_0 = \omega/c_0$ |
| l | Vibration mode where l = 1, 2, 3, . . . |
| L | Length of membrane |
| $L_v$ | Cavity length |
| m | Membrane-to-air mass ratio or the ratio of the structural mass to the fluid mass |
| $p_i$ | Incident wave |
| $p_r$ | Reflected wave, Equation 6 |
| $p_{+rad}$ | Radiation pressure acting on the upper surface of the membrane, Equation 1 |
| $p_{-rad}$ | Radiation pressure acting on the lower surface of the membrane facing the cavity, Equation 2 |
| $p_{-ref}$ | Reflection of the radiated waves into the cavity by the two vertical walls of the cavity, Equation 3 |
| $p_t$ | Transmitted wave, Equation 7 |
| T | Dimensionless axial tensile force, $T = \dfrac{T^*}{h^* \rho_0^* (c_0^*)^2}$ |
| TL | Transmission loss |
| $TL_{ct}$ | Criterion value of transmission loss |
| $T_{opt}$ | Optimal tensile force for maximum $f_2/f_1$ |
| V | Vibration velocity of the membrane |
| $V_j$ | Vibration amplitude of the jth in-vacuo mode |
| x, y | Cartesian coordinates |
| x', y' | Cartesian coordinate for the sound source |
| $x_c, y_c$ | Cartesian coordinates in the region of cavity where the relevant duct acoustics scale is $h_c$, Equation 2 & 3 |
| $x_c', y_c'$ | Cartesian coordinate for the sound source in the region of cavity where the relevant duct acoustics scale is $h_c$, Equation 2 & 3 |
| $Z_{ji}$ | Modal impedance lth modal coefficient of fluid loading caused by a prescribed jth vibration of unit amplitude, Equation 4 |

Greek symbols

| | |
|---|---|
| $\delta_{0n}$ | Kronecker delta: $\delta_{0n} = 0$ for $n \neq 0$, and $\delta_{0n} = 1$ when n = 0. |
| $\rho_0$ | Fluid density, for air it's 1.225 kg/m$^3$ |
| $\xi$ | Local dimensionless variable defined as $\xi = x/L + 1/2$ |
| $\xi'$ | Dimensionless source coordinate defined as $\xi' = x'/L + 1/2$ |
| $\psi_n$ | Duct acoustics mode defined as $\psi_n(y) = \sqrt{2 - \delta_{0n}} \cos(n\pi y)$, Eq. (12) |
| $\omega$ | Angular frequency $\omega = 2\pi f$ |
| $L_j$ | Linear structural operator for the jth mode which is defined as $mi\omega + \dfrac{T}{i\omega}\left(\dfrac{j\pi}{L}\right)^2$, j = 1, 2, 3, ... |

Symbols with astrisks are dimensional quantities that are normalized to become dimensionless quantities by the equaton following Equation 3.

What is claimed is:

1. A method of designing a chamber for attachment of a duct to reduce noise in said duct, said chamber having a peripheral chamber height $h_c$ to reduce noise in a duct having a height h by, said duct being separated from said chamber by a membrane having a tension T and membrane length L, including the steps of:

a) setting the chamber height $h_c$, the membrane length L, and tension T to predetermined values;

b) setting incident wave frequency $f$ such that angular frequency $\omega=2\pi f$, $c_0$=speed of sound;

c) determining the radiation pressure acting on the upper surface of the membrane facing away from the chamber, $p_{+rad}$ caused by a unit modal amplitude;

d) determining the radiation pressure acting on the lower surface of the membrane facing towards the chamber, $p_{+rad}$ caused by a unit modal amplitude;

e) determining the radiation pressure by reflection of the radiated waves into the cavity by the walls of the chamber, $p_{-ref}$ caused by a unit modal amplitude;

f) calculating vibration amplitude of the jth in-vacuo mode $V_j$ using the modal impedance yielded from $p_{+rad}$, $p_{-rad}$, and $p_{-ref}$;

g) calculating transmitted wave $p_t$ using calculated vibration amplitude $V_j$ from step f);

h) calculating transmission loss TL for $f$, i) repeating steps b) to h) by varying wave frequency $f$ to calculate transmission loss TL for different $f$, and j) determine a frequency range $f_1$ and $f_2$ from the transmission loss TL versus $f$ spectrum such that transmission loss TL within $f_1$ to $f_2$ is higher than or equal to a threshold transmission loss $TL_{cr}$ and wherein at the one of the chamber height $h_c$, membrane length L or tension T are varied and steps a) to j) are repeated to obtain an optimized noise-reduction spectrum for said duct.

2. The method of claim 1 further including the step of:
k) repeating steps a) to j) by varying the tension T to determine an optimal tension $T_{opt}$.

3. The method of claim 2, wherein the tension T is varied from 0 to $p_o c_o^2 h^2$, $P_o$=fluid density of the medium contained in the chamber.

4. The method of claim 2 further including the step of:
l) repeating steps a) to k) by varying the chamber height $h_c$ to determine optimal chamber height $h_{copt}$.

5. The method of claim 2 further including the step of:
m) repeating steps a) to k) by varying membrane length L to determine optimal membrane length $L_{opt}$.

6. The method of claim 1, wherein wave frequency $f$ is varied from 0 to $$\frac{c_o}{2h}$$

such that the angular frequency $$\omega = 2\pi f = 0 \text{ to } \frac{\pi c_o}{h}, c_0 = \text{speed of sound}.$$

7. The method of claim 1, wherein said chamber is filled with air.

8. The method of claim 1, wherein said chamber is filled with helium.

9. The method of Claim 1, wherein the threshold transmission loss $TL_{cr}$ is $$10\log_{10}\left[1 + \frac{1}{4}\left\{\left(1 + \sqrt{6h_c L}\right) - \left(1 + \sqrt{6h_c L}\right)^{-1}\right\}^2\right].$$

10. The method of claim 9, wherein the threshold transmission loss $TL_{cr}$ is 10 dB.

11. A chamber attaching to a duct having a height h for reducing noise in said duct, including a peripheral chamber height $h_c$ and membrane length L, and a membrane having a tension T separating said chamber from said duct, wherein any one of the chamber height $h_c$, the membrane length L, or the tension T is set to an optimal value determined by any one of the methods of claims 1 to 10.

* * * * *